March 10, 1970    H. L. WASILEWSKI ET AL    3,500,433
PRECISION DEPTH RECORDER
Filed Nov. 8, 1965    2 Sheets-Sheet 1
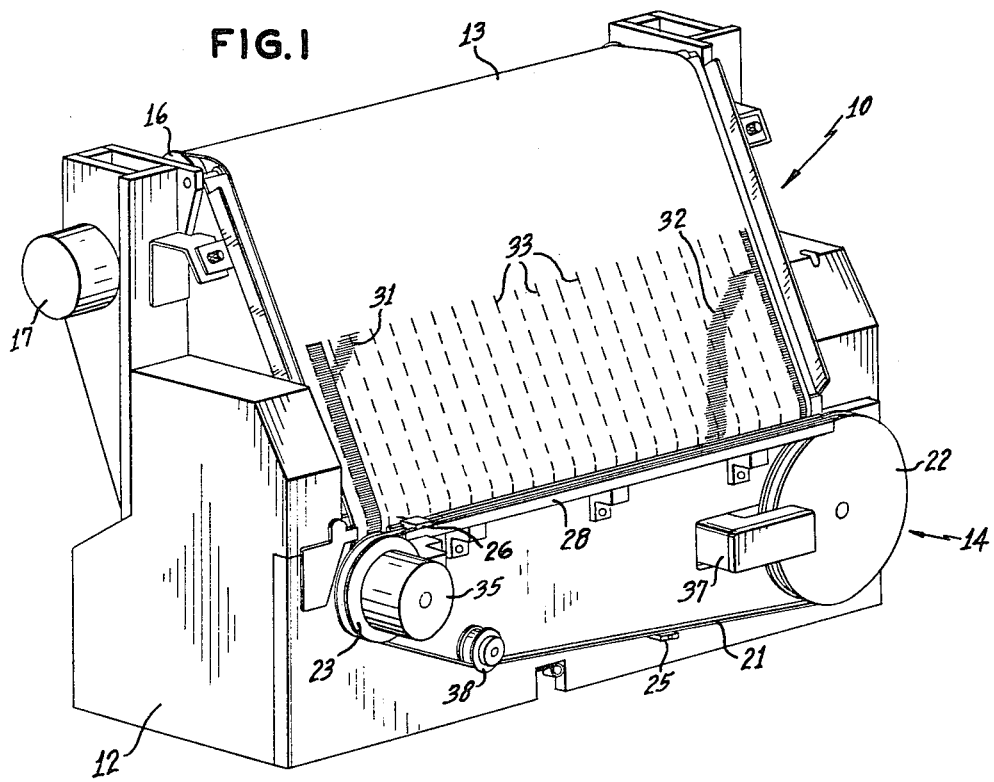
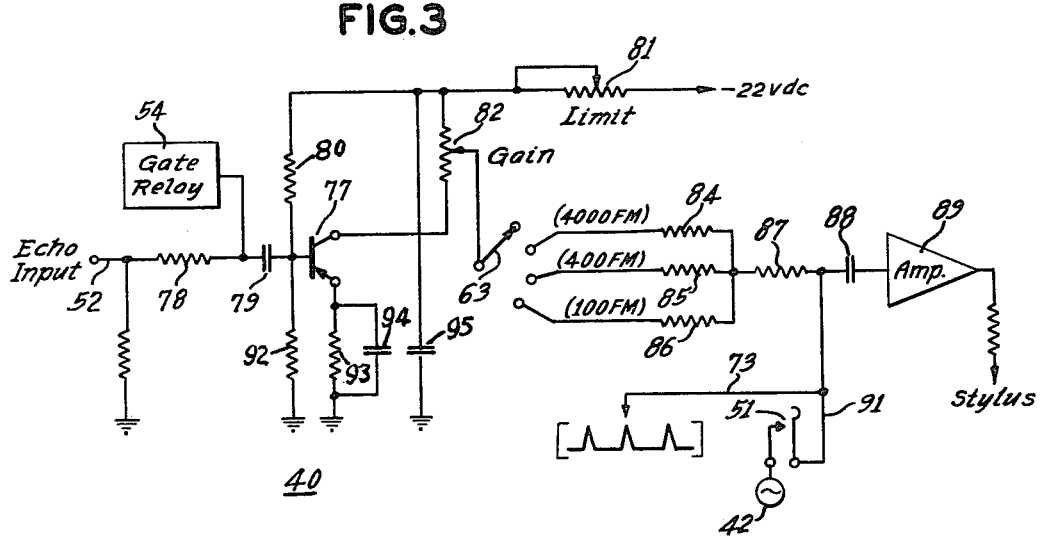

›United States Patent Office 3,500,433
Patented Mar. 10, 1970

3,500,433
PRECISION DEPTH RECORDER
Henry L. Wasilewski, Jackson Heights, N.Y., and Thomas
K. De Witt, Newport, R.I.; said Wasilewski assignor to
Littons Systems, Inc., Beverly Hills, Calif.
Filed Nov. 8, 1965, Ser. No. 520,539
(Filed under Rule 47(a) and 35 U.S.C. 116)
Int. Cl. G01d 9/02
U.S. Cl. 346—35        7 Claims

ABSTRACT OF THE DISCLOSURE

A precision depth recorder for recording sonar soundings in which the recording signal level is controlled by a limiter-amplifier stage and by a manually adjustable control connected to or a part of the scale adjustment which varies the rate of travel of the recording stylus.

---

This invention relates to a precision depth recorder for producing accurately-defined recording of sonar soundings derived from external sonar equipment, in chart form.

In oceanographic research the basic instrument for studying the ocean bottom is the sonic echo-sounder. This instrument provides a record of the shape of the bottom and an indication of its depth. It may be said to provide a method of guiding the intelligent use of all other instruments used to study the deep ocean.

The instrument consists of a transducer, a transmitter, a receiver and a recorder. The transducer converts pulsed electrical energy into sonic water-borne energy. The transmitter supplies electrical energy to the transducer. The receiver amplifies the reflected signals, or echoes, and drives the recorder which is arranged to display the sonic pulse traveltime intervals in a precise and integrated fashion in the form of a continuous record. The recorder is also used to control the keying of the transmitter, the gating of the receiver, and to provide a time base for correlating this depth record with the ship's position. A sounding and recording system of this kind was described in paper No. 57–317 entitled "Facsimile Recording Technique in Hydrographic Service," presented by Bernard Luskin at the winter general meeting of the American Institute of Electrical Engineers, in New York City, in January 1957.

In the system described by Luskin, a precision depth recorder was employed of the chart or continuous-web type, and Luskin stated that a substantial improvement in resolution and accuracy was effected by substituting a facsimile-type recorder for the impulse recorders previously used in oceanographic survey work. The recorder described by Luskin employed electro-sensitive chart paper which was marked by the flow of current from a conducting stylus in contact with the surface of the paper. The general structural features of the recorder and a diagram of the circuits and operating components of the transducer, transmitter, receiver and recorder were described in this paper, the disclosure of which is incorporated herein by reference.

In depth recorders for use in a system of this character it is essential to provide for changing the scale of the recording across the width of the recording sheet. This permits the recording of depth or other echo signals from the sonar equipment to depths such as four-thousand fathoms, for example, and then expanding the scale for accurate, easily interpreted signal impulses at depths of, say, zero to one-hundred fathoms, or zero to four-hundred fathoms.

This variable-scale recording is preferably accomplished by varying the speed of travel of the recording stylus across the width of the recording sheet. However, the recording density where a substantially constant electric current is applied to the stylus depends upon the relative speed between the tip of the stylus and the surface of the recording paper. Thus the paper may be burned by the current, or be so faint that the recording is illegible unless the stylus current is varied as the recording scale is changed.

It is an object of the present invention to regulate the current applied to the recording stylus and to automatically maintain the stylus current at an optimum value not only upon changes in echo-input signal but also when the speed of the recording mechanism is altered to change the scale of the depth recording.

Another object of the invention is to provide an improved print amplifier for a depth recorder operating in the continuous-sweep mode, for example, where the sonar transmitter is keyed at the beginning of each sweep or traverse of the stylus across the recording chart, and one echo is recorded for each sweep in all depths.

In general terms, the object of the present invention is to improve the circuit of the recorder in order to insure accurate data recording of high resolution, and ease of adjustment under varying conditions of service, and with changing scale or depth-recording conditions.

In accordance with the invention, as embodied by way of example in a depth recorder operated in the continuous-sweep mode with provision for expansion of the recorded information, the print amplifier includes a limiter-amplifier stage having adjustable limiting means for maintaining the desired recording-signal level over a wide range of input signal. In addition, a manual gain control is provided for precisely adjusting the signal level; and a selective switch is provided to connect circuits of different impedance in the recording stylus circuit, said switch being connected to the scale or depth-range control which is used to vary the speed of travel of the recording stylus to expand or compress the scale of the recording when required. Thus the scale adjustment or control may be arranged to change the recording range from zero to one-hundred fathoms, to zero to four-hundred fathoms, or zero to four-thousand fathoms, for example.

The limiter-amplifier stage may comprise a transistor, with the maximum output voltage of its collector controlled by varying the operating voltage from the power supply. Alternatively, equivalent forms of amplifier may be substituted such as a VT amplifier, with provisions for varying the B+ voltage applied to the plate of the tube or to the plate-load resistor.

In this manner, precise recording with maximum resolution is obtained by the provision for rapid adjustment of the print amplifier as required by changes in the level of the echo input signal, and for changing the level of the recording current automatically to a predetermined value when the recording scale is changed to provide expansion or compression of the recorded trace.

Other objects and advantages of the invention will appear from the following description of a typical embodiment thereof shown in the accompanying drawings, wherein:

FIG. 1 is a perspective view of the precision depth recorder with the front cover assembly containing electronic components removed to expose the stylus recording mechanism;

FIG. 3 is a schematic circuit diagram of the print amplifier.

Figure 2:
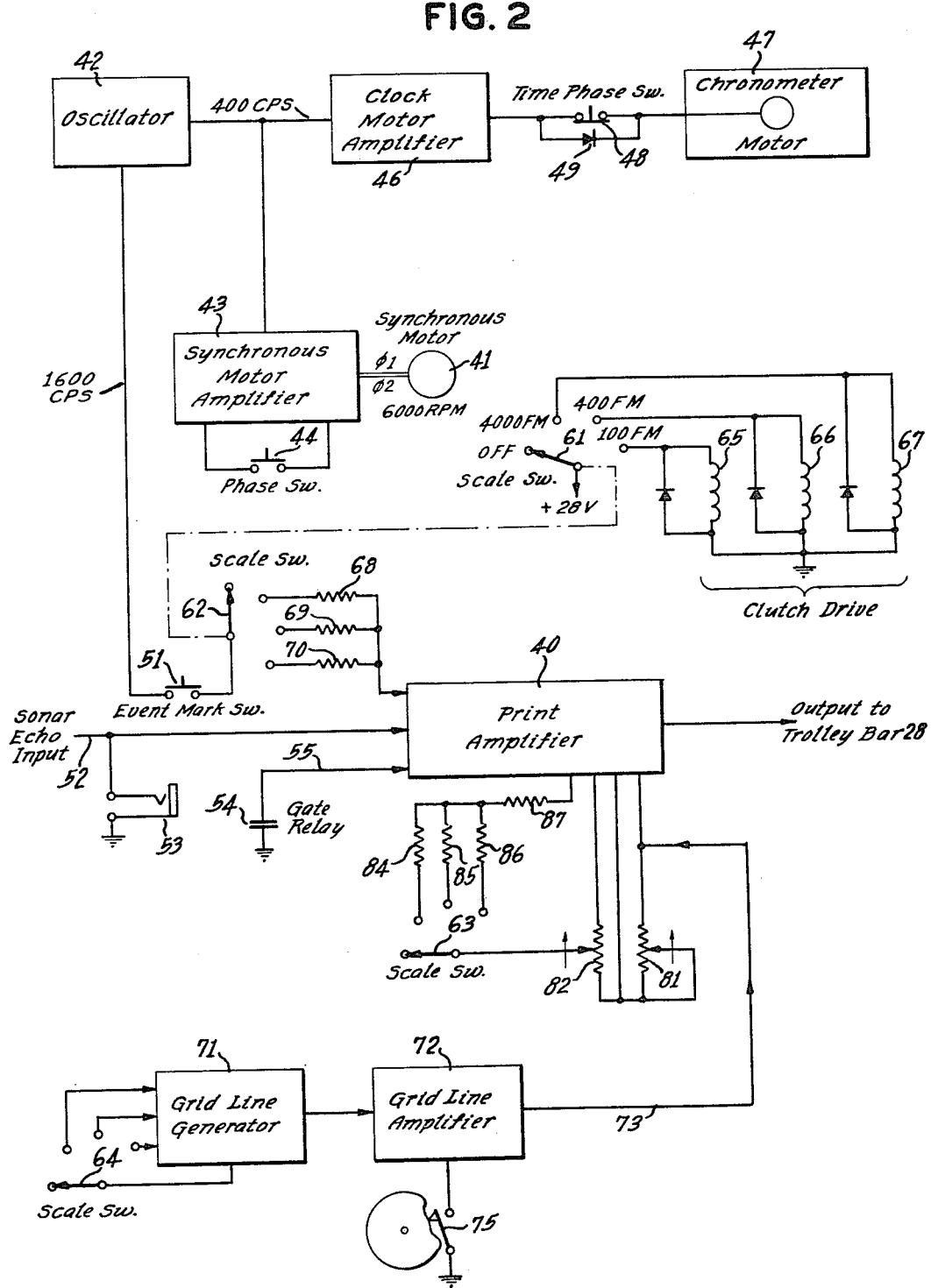
FIG. 2 is a functional block diagram of the principal components of the depth recorder and associated control system.

Referring to FIG. 1, the recorder 10 comprises mainly a base enclosure 12 and means for supporting and feeding a chart or continuous web 13 of recording paper through recording mechanism 14 mounted on the front wall of the base enclosure 12. The detailed construction of the recorder may be similar to that described in the above-mentioned Luskin article. The chart 13 is advanced by conventional feed rollers from a suppy roll (not shown) in the enclosure 12. As shown, the chart 13 is maintained under tension by a take-up roll 16 driven by a motor 17 through the usual slip-clutch mechanism.

By way of illustration, the recording mechanism 14 comprises an endless traveling belt 21 supported on pulleys 22 and 23, and carrying spaced styluses, two of which are indicated at 25 and 26, for marking the electrosensitive recording chart 13. The belt or stylus carrier 21 is propelled by the synchronous drive pulley 22 and each stylus is guided in a straight line as it traverses the width of the chart 13 by a guide track 28. Signal current may be supplied to the recording stylus through said stationary metallic track, thus constituting a trolley or contact bar. Obviously any equivalent marking mechanism may be substituted for that shown and other types of recording material may be used.

The recorder 10 is designed to operate in the continuous-sweep mode, the sonar transmitter being keyed at the beginning of each sweep or traverse of the stylus across the recording chart 13. The recording scale is changed or adjusted by changing the rate of travel of the stylus so that one echo is recorded for each sweep in all depths. In FIG. 1, a typical recording of echo signals is indicated by the recorded traces 31 and 32. The changing position of the recorded traces on the chart indicates variations in the depth of the ocean bottom since the position of the recording stylus is accurately controlled with respect to the time when the sonar transmitter is keyed. As will be explained below, the scale or depth range is changed by changing the speed of rotation of the driving pulley 22 from one constant predetermined speed to another. In the particular recorder described herein by way of example, the drive pulley 22 is driven by a constant-speed motor through changespeed gearing which is electrically controlled by a scale switch to vary the scale or range from 0–100 fathoms to 0–400 fathoms or 0–4000 fathoms (or other desired scale).

As shown in the drawing, the chart recording includes accurately positioned grid lines 33 which are equally spaced and are printing automatically by the recording styluses while the recorder is in operation. For example, the grid lines may be printed by applying periodic current impulses to the stylus, said impulses being generated, for example, by a periodic photo-electric impulse generator 35 of conventional character. The impulse generator may include a perforated light modulating cylinder which is rotated by the run or idler pulley 23 to periodically interrupt the light impinging upon a photoelectric device, thus producing current impulses in response to the light excitation through the modulating cylinder as known in the art. Since the grid line generator 35 is mounted on the pulley 23, the periodic impulses generated are accurately timed in relation to the position of the recording styluses 25, 26. Similarly, a conventional keying generator 37 is disposed adjacent the rotating drive pulley 22, which is arranged to generate a keying signal for operating the sonar transmitter in timed relation to the positions of the pulley 22 and the connected recording mechanism, as well known in the art. As shown, an adjustable tensioning pulley 38 may also be provided for adjusting the tension in the belt or carrier 21.

A functional block diagram of the depth recorder is shown in FIG. 2. The components and circuits are conventional except for the print amplifier 40 and the associated circuits and controls for the amplifier. Therefore, the detailed construction of the various components is not shown for the sake of clarity.

Referring to FIG. 2, a synchronous motor 41 is shown, which rotates the drive pulley 22 for driving the recording mechanism. The synchronous motor 41 may be of the hysteresis type operating at a constant speed of 6000 r.p.m. on 400 cycles. It is connected to a precision oscillator 42 through the motor amplifier 43. The oscillator 42 generates two exact output frequencies of 400 and 1600 c.p.s. The 400-cycle output is connected to the amplifier 43 which generates a two phase 400-cycle output of sufficient amplitude to drive the motor 41. A manual phase switch 44 is provided for momentarily interrupting or reducing the output of the amplifier 43 to reduce the speed of the motor 41 when it is desired to shift the position of the recording trace on the chart 13. This control may be employed for framing the recording of weather map information when the recorder is employed as a map recorder. The 400-cycle output of the oscillator 42 is also connected through a second motor amplifier 46 to a motor-driven chronometer or clock 47. A time-phase pushbutton switch 48 in shunt relation to a diode 49 is interposed between amplifier 46 and the chronometer 47. When the pushbutton switch 48 is depressed, the diode 49 is connected in series with the clock motor, thus causing dynamic braking of the motor to vary the clock setting.

The second output of oscillator 42 is connected through a normally open manual switch 51 to the print amplifier 40. When the switch 51 is closed, signal current is applied from the output of amplifier 40 to the trolley bar 28 to mark the chart. Thus, a line across the chart is recorded which may be used to denote the occurrence of a particular event at a given point in the recording process. Ordinarily the operator would write a note on the chart to record the meaning of the event mark produced by closing switch 51.

The echo-signal input from the sonor receiver is impressed upon the print amplifier 40 through conductor 52 as shown in detail in FIG. 3. A jack 53 may be provided to permit the operator's earphones to be plugged into the signal input 52. The usual gating relay 54 may also be provided and connected to the print amplifier 40 through the conductor 55.

As already mentioned, a scale switch is provided for adjusting the speed of the recording stylus as it traverses the recording chart and, as shown in FIG. 2, this switch comprises four movable contacts 61, 62, 63 and 64 which are ganged together and are movable from the "off" position to three operating positions denoted as 4000 FM, 400 FM and 100 FM, respectively. These indicia refer to the depth in fathoms. The contact 61 of the scale switch controls the rotative speed of the drive pulley 22 in any well-known manner. For example, a gear box may be provided with three magnetic clutches operated by the magnets 65, 66 and 67 depending upon the adjustment of the scale switch 61 to change the gear ratio between the driving motor 41 and the drive pulley 22. As the scale switch 61 is moved from the second to the third contact, the drive speed is changed in the ratio of 400/4000; and further increased as indicated when it is moved to the fourth contact. Thus the recording scale is expanded or compressed by adjustment of the scale switch as required by the changes in the elapsed time between the transmission of the sonar transmitter pulse and the reception of the echo signal.

The contact 62 of the scale switch simultaneously varies the input signal level from the oscillatior 42 in accordance with the changes in the speed of travel of the recording stylus to avoid burning the recording paper at a low stylus speed or illegible recording at high speed of travel. As already explained, the electro-sensitive recording paper requires that the signal level be increased as the speed of travel of the recording stylus increases to effect proper recording while on the other hand, the current must be reduced at slower speeds to effect sharp recording or avoid burning through the recording sheet. In order to effect this result automatically, in response to adjustment to the scale switch, the second, third, and fourth contacts of the switch 62 are connected through separate resistors 68, 69 and 70 of different values to maintain the desired signal level input to the print amplifier 40.

The operation of contact 63 of the scale switch controls the level of the stylus current, as will be explained in connection with the description of FIG. 3 showing the detailed circuits of the first stage of the print amplifier 40. The contact 64 of the scale switch similarly controls the output of a grid line generator 71 which is connected through an amplifier 72 to the conductor 73 through which the grid line marking pulses are impressed upon the print amplifier. If desired, the output of the amplifier 72 may be interrupted for a short interval every three minutes by a cam-operated clock switch 75 to interrupt the grid lines on the chart to provide a timing indication as a part of the recording.

Referring to FIG. 3 showing the input circuit and first stage of the print amplifier 40, the input signal on the conductor 52 is impressed upon the base of a transistor 77 through a resistor 78 and capacitor 79. The transistor 77 is a part of the variable limiter stage which automatically maintains the optimum level of the recording stylus current. The maximum peak-to-peak output voltage at the collector of transistor 77 is limited by varying the operating voltage through the adjustment of a limiting control potentiometer 81. The potentiometer 81 is normally set for the conditions encountered in a particular operation and requires no readjustment during normal operation unless conditions change so that the echo input signal changes over a comparatively wide range. Fine adjustment required during a particular run is accomplished by varying the gain control rheostat 82 which is bridged across the transistor output and acts as a collector load resistor. The voltage appearing across the adjustable contact of rheostat 82 is connected to the movable contact 63 of the scale switch. Three resistors 84, 85, 86 are connected to the respective contacts engaged by the movable scale switch contact 63. Thus, the selection of either resistor 84, 85 or 86 in series with the gain control 82 and the input impedance of transistor 77 attenuates the input voltage to the base of the transistor as required when switching from scale to scale. The signal level applied through resistor 87 and capacitor 88 to the output amplifier 89 is varied automatically as the scale switch is adjusted to maintain optimum recording conditions.

Auxiliary inputs to the amplifier 89 are connected through conductor 73 from the grid line generator or conductor 91 from the event mark signal switch 51. The mark switch 51 is connected to an AC source such as oscillator 42, of sufficient magnitude to energize the recording stylus when amplified by the amplifier 89. The gate relay 54 is arranged in known manner to ground the echo input signal to prevent signal or noise received at the sonar receiver from printing on the chart paper.

By way of example, when transistor 77 is a germanium transistor, type 2N1309, the following resistors and capacitors may be employed in the print amplifier circuit:

| | |
|---|---|
| R78, 3.3K | R87, 0.39K |
| C79, 10 µf. | C88, 10 µf. |
| R80, 3.9K | R92, 1.2K |
| R82, 0.5K | R93, 0.51K |
| R84, 22K | C94, 10 µf. |
| R85, 4.7K | C95, 2.2 µf. |
| R86, 1.5K | |

It will be apparent that the invention simplifies the operating technique and insures improved recording in the operation of a precision depth recorder. While an illustrative embodiment of the invention has been described in detail for the purpose of explaining the underlying principles thereof, numerous other arrangements may be devised by those skilled in the art without departing from the spirit and scope of the invention. Thus by way of example and not of limitation, the mechanism for altering the scale of the recording may be modified in various ways and the recording level adjustment changed to correspond to such modification; and an equivalent design of print amplifier may be substituted for that shown and described herein.

What is claimed is:

1. In a depth recorder designed to operate in the continuous-sweep mode, in combination;
   chart recording mechanism including a travelling stylus,
   switch means including an adjustable switch having a plurality of operative positions for changing the rate of travel of said stylus to alter the recording range, and
   means connected to said switch means for concurrently changing the recording signal level on said stylus upon adjustment of said adjustable switch.

2. In a depth recorder designed to operate in the continous-sweep mode, in combination:
   chart recording mechanism including a travelling stylus,
   means including a multi-position switch for changing the rate of travel of said stylus from one predetermined speed to another to alter the recording range, and
   means for varying the recording signal level on said stylus,
   said last-mentioned means including contacts of said switch.

3. In a depth recorder for recording sonar soundings, in combination:
   recording means,
   an echo-signal input circuit,
   means for amplifying the signal impulses in said input circuit and impressing the amplified signal impulses on said recording means,
   scale adjustment means for varying the range of the recording means,
   coarse and fine level adjustment controls for maintaining desired recording signal levels, and
   a level control means in circuit with said amplifier for changing the amplifier output level when said scale adjustment means is operated.

4. In a depth recorder for recording sonar soundings in chart form, in combination:
   means for feeding a strip of recording paper,
   stylus mechanism for recording electrical signal impulses on said recording paper,
   means including said stylus mechanism to record traces on the surface of the recording paper representing echo-input signals,
   said recorder further comprising an echo-signal input circuit,
   a limiter-amplifier stage including an amplifier connected to said input circuit,
   a source of power supply voltage for said amplifier, and
   means to vary the amplifier output signal level by varying the voltage supply to the amplifier from said source to control the printing density of the recorded impulses on said recording sheet.

5. A depth recorder according to claim 4, in which the limiter-amplifier stage comprises a transistor, and the voltage supply to said transistor is varied to control printing density.

6. In a depth recorder for recording sonar soundings in chart form, in combination:
   means for feeding a strip of recording paper,
   recording stylus mechanism including a traveling stylus movable across said strip of recording paper for recording electrical signal impulses thereon,
   means for driving said recording mechanism to propel said stylus at different predetermined rates of travel to vary the scale of the signal recording,
   said recorder further comprising an echo-signal input circuit,
   a limiter-amplifier stage connected to said input circuit, said limiter-amplifier stage including a signal-limiting control means to control the density of recording on said recording chart,
an independent, manually adjustable gain control for adjusting the recording density, and
means for amplifying the signal output of said limiter-amplifier stage and impressing the amplified signal current on said stylus.

7. A depth recorder according to claim 6, in which a selectively adjustable impedance is provided for adjusting the level of the recording signal as the depth range of the recorder is changed.

References Cited

UNITED STATES PATENTS

| 2,443,647 | 6/1948 | Waterman | 346—74 |
| 2,647,033 | 7/1953 | Faus | 346—74 |
| 2,941,183 | 6/1960 | Bischof | 340—3 |
| 3,309,650 | 4/1967 | Ross et al. | 340—3 |

JOSEPH W. HARTARY, Primary Examiner

U.S. Cl. X.R.

340—3; 346—65, 74, 139